US008579746B2

(12) United States Patent
Mori et al.

(10) Patent No.: US 8,579,746 B2
(45) Date of Patent: Nov. 12, 2013

(54) CHAIN GUIDE MECHANISM

(75) Inventors: Kaori Mori, Osaka (JP); Masahiko Konno, Osaka (JP)

(73) Assignee: Tsubakimoto Chain Co., Osaka (JP)

(*) Notice: Subject to any disclaimer, the term of this patent is extended or adjusted under 35 U.S.C. 154(b) by 426 days.

(21) Appl. No.: 13/045,856

(22) Filed: Mar. 11, 2011

(65) Prior Publication Data
US 2011/0251002 A1    Oct. 13, 2011

(30) Foreign Application Priority Data
Apr. 9, 2010  (JP) ................................. 2010-090665

(51) Int. Cl.
*F16H 7/18*  (2006.01)

(52) U.S. Cl.
USPC ......................................................... 474/140

(58) Field of Classification Search
USPC .................................................. 474/111, 140
See application file for complete search history.

(56) References Cited

U.S. PATENT DOCUMENTS

| | | | | |
|---|---|---|---|---|
| 6,358,169 B1* | 3/2002 | Markley | ......................... | 474/111 |
| 7,097,579 B2* | 8/2006 | Markley | ......................... | 474/111 |
| 7,390,276 B2* | 6/2008 | Tryphonos | ..................... | 474/109 |
| 7,429,226 B2* | 9/2008 | Tryphonos | ..................... | 474/111 |
| 7,479,077 B2* | 1/2009 | Markley et al. | ................ | 474/111 |
| 8,225,907 B2* | 7/2012 | Soucy et al. | ................. | 184/15.1 |
| 8,328,426 B2* | 12/2012 | Sasaki et al. | ................... | 384/322 |
| 8,454,462 B2* | 6/2013 | Konno et al. | ................. | 474/111 |
| 8,465,385 B2* | 6/2013 | Konno et al. | ................. | 474/111 |
| 2010/0089702 A1* | 4/2010 | Sasaki et al. | ....................... | 184/5 |

FOREIGN PATENT DOCUMENTS

JP           11-063128           3/1999

OTHER PUBLICATIONS

U.S. Appl. No. 12/980,661, filed Dec. 29, 2010.
U.S. Appl. No. 12/915,226, filed Oct. 29, 2010.
U.S. Appl. No. 12/990,661, filed Dec. 29, 2010.

* cited by examiner

*Primary Examiner* — William A Rivera
*Assistant Examiner* — Michael Riegelman
(74) *Attorney, Agent, or Firm* — Howson & Howson LLP

(57) ABSTRACT

In a chain guide mechanism having a guide bridge for integrally holding two chain guides, a chain and a driving sprocket for more efficient assembly and maintenance, the guide bridge has a oil inlet on a surface of its sprocket-pressing base for receiving oil from an oil supply port in an engine block on which the guide bridge is mounted. The oil inlet communicates, through an internal passage within the base of the guide bridge, with an oil discharge port within a groove in which teeth of the driving sprocket travel.

8 Claims, 15 Drawing Sheets

CHAIN GUIDE MECHANISM

CROSS REFERENCE TO RELATED APPLICATION

This application claims priority on the basis of Japanese Patent Application 2010-090665, filed on Apr. 9, 2010. The disclosure of Japanese Patent Application 2010-090665 is incorporated by reference.

FIELD OF THE INVENTION

This invention relates to a chain guide mechanism for use in an engine timing drive to guide and maintain tension in an endless timing chain such as a silent chain, a roller chain or the like engaged in driven relationship with a crankshaft sprocket and in driving relationship with one or more camshaft sprockets within a timing drive compartment formed between an engine block and a timing chain cover. The invention relates more particularly to the improvement of lubrication in a chain guide mechanism comprising a plurality of chain guides for sliding engagement with a chain, and a guide bridge for holding the chain guides.

BACKGROUND OF THE INVENTION

FIG. 13 shows a known engine timing drive composed of a chain guide mechanism, a driving sprocket S1 mounted on a crankshaft, a pair of driven sprockets S2 and S3 mounted on valve-operating camshafts, an endless timing chain C engaged with the driving and driven sprockets, a pivoting chain guide 520 for guiding and keeping adequate tension in the timing chain, a tensioner T for exerting a force pressing the guide 520 against the span of the chain traveling from the driving sprocket S1 to driven sprocket S2, and a fixed chain guide 530 in sliding engagement with the span of the chain traveling from driven sprocket S3 to driving sprocket S1 for guiding the travel of the chain. The timing drive is typically disposed within a timing drive compartment (not shown) formed by an engine block and a timing chain cover.

The pivoted chain guide 520 is pivotably mounted on a mounting shaft B fixed to the engine block, and the fixed chain guide 530 is attached to the engine by mounting shafts B3 and B4, which are also fixed to the engine block. In assembly of the timing drive, and in disassembly of the timing drive for maintenance or replacement, the driving sprocket S1, the driven sprockets S2 and S3, the pivoting chain guide 520, the fixed chain guide 530, and the timing chain C, need to be mounted or dismounted individually. Consequently the process of assembly and disassembly is difficult and time-consuming.

To alleviate the aforementioned difficulties in assembly and disassembly of a timing drive, another known timing system has been provided in which the pivoted and fixed chain guides are connected by a guide bridge. As shown in FIG. 14, in the chain guide mechanism 600 of this known timing system, a fixed chain guide 630 is formed as a unit with a guide bridge 610. A mounting hole 612, located adjacent an end of the guide bridge 610 remote from the fixed guide, receives a mounting boss 621 on a pivoted guide 620, which in, turn receives a mounting shaft B on the engine block. The mounting shaft B, the boss 621, and the mounting hole 612 form a fulcrum about which the guide 620 pivots.

The guide bridge 610 is formed so that it defines the relative positions of the driving sprocket S1, the driven sprockets S2 and S3 and the pivoting chain guide 620, so that the positioning of these components during assembly or maintenance is simplified. A provisional assembly can be made before the components are mounted on the engine as shown and explained in Japanese laid-open Patent Application No. Hei.11-63128.

However, while the known chain guide mechanism 600 in FIG. 14 integrates the pivoting chain guide 620 and the fixed chain guide 630, it only defines the relative positional relationships of the driving sprocket S1, the driven sprockets S2 and S3, and the timing chain C. It does not integrally hold the sprockets and chain. Consequently, the improvements afforded by the guide bridge 610 are relatively minor.

Another problem with the chain guide mechanism 600 in FIG. 14 is that, because the guide bridge 610 that connects the fixed and pivoted guides extends across the timing chain only on the side of the timing chain C remote from the engine block, the mounting hole 612 can become disconnected from the boss 621 of the pivoting 620 if the guide bridge 610 deforms in the direction of its thickness, as shown in FIG. 15.

Another problem is that the guide bridge 610 hampers the flow of lubricant to the sprocket S1.

SUMMARY OF THE INVENTION

The invention addresses the above-described problems by providing a simple chain guide mechanism which is capable of integrally holding a chain and a sprocket along with a plurality of chain guides, which can be assembled with improved efficiency, and which provides for an improved supply of lubricant to the sprocket.

The chain guide mechanism according to the invention comprises a plurality of chain guides arranged for sliding relationship with a traveling transmission chain, and a guide bridge integrally holding the chain guides.

The guide bridge has a base, and a pair of arms extending in opposite directions from the base. Each of the arms comprises two opposed, spaced parts extending on opposite sides of one of the chain guides whereby a portion of one of the chain guides is disposed between the opposed parts of each of the arms. A pair of cylindrical mounting bosses extends in opposite directions from each said portion of a chain guide, and each of the opposed, spaced parts is formed with a guide mounting hole for receiving a mounting boss on the chain guide portion therebetween.

The base of the guide bridge extends from an intermediate portion between the arms in a direction substantially perpendicular to the directions in which the arms extend. Therefore, the guide bridge is substantially T-shaped.

The base has a sprocket-pressing end portion for sliding contact with a sprocket, and a side surface facing in a direction perpendicular to the directions in which the arms extend and also perpendicular to the direction in which the base extends from the intermediate portion of the bridge. The sprocket-pressing portion has a central groove that permits sprocket teeth to pass, and contact portions on both sides of the central groove for sliding engagement with boss portions of a sprocket on both sides of the sprocket teeth.

The structure described above, allows the guide bridge to use short arms which can be light in weight, but are not as easily deformed as longer arms. With the use of short arms, it is possible to prevent the guide mounting holes from being accidentally disengaged from the mounting bosses during operation of the chain drive as well as during assembly and maintenance.

The structure also makes it possible to hold the chain together with the chain guides, and thereby facilitate assembly and maintenance by assembling the chain, guide bridge and guides in advance of installation on an engine block.

One of the chain guides can be provided with a projection on the outer circumference of at least one of its cylindrical mounting bosses, and the guide mounting hole receiving the mounting boss having the projection is formed with a notch that mates with the projection, whereby rotation of the chain guide relative to the guide bridge is prevented. The projection and notch provide a convenient way to mount a fixed chain guide and prevent its rotation, and further facilitate assembly and maintenance.

The grooved base and sprocket-engaging portions on both sides of the groove make it possible to preassemble the chain guides, the chain, and a sprocket, and to hold the sprocket, chain guides and chain together as a preassembled unit before installation on an engine block.

The guide bridge has an oil inlet on the side surface of the base, an oil discharge port opening to the groove of the sprocket pressing portion, and an oil passage provided within the base for connecting the oil inlet to the oil discharge port.

When the oil inlet of the bridge is connected to an oil supply port on the engine block or supplied with oil through another path, it becomes possible to supply lubricating oil through the oil passage and the oil discharge port directly to the teeth of the sprocket. Therefore, even though the guide bridge is in a position such that it would ordinarily hamper the flow of oil onto the sprocket, it becomes possible to maintain adequate lubrication of the sprocket.

In a preferred embodiment, a side surface of the base which faces perpendicular to the directions in which the arms extend and also perpendicular to the direction in which the base extends, is provided with a projection. The oil inlet is formed in the projection, and the projection can be provided with a seal for engaging an oil supply port and for preventing leakage of the oil supplied by the oil supply port to the oil inlet. By preventing leakage, the seal ensures an adequate supply of lubricant to the tooth surfaces of the sprocket.

The seal can be a resilient member that protrudes farther than the projection. The resilient member more effectively prevents leakage of oil by providing a tight seal on the outer circumference of the projection, and by tightly engaging the engine block or other source of oil.

In an alternative embodiment, the seal can be an annular sealing member fitted to an inner circumferential surface of the projection on the side surface of the base. When the seal is an annular sealing member fitted to the inner circumferential surface of the projection, it is possible to engage the projection of the bridge with an oil supply projection on the engine block while mounting the chain guide mechanism. Accordingly, with this embodiment, assembly and maintenance of the chain guide mechanism can be carried out more efficiently. Moreover, since the projection on the engine block serves as a positioning device it is possible to eliminate other positioning devices.

In either case, whether the seal protrudes beyond the projection on the guide bridge or is in the form of an annular seal fitted to the inner circumferential surface of the projection, the seal can be a rubber ring. In this case, because the rubber ring tends to adhere to the surfaces which it engages, it more effectively suppresses leakage of lubricant, and further ensures an adequate supply of lubricant to the sprocket.

In an alternative embodiment, the base can also have an oil-receiving portion for receiving leaking oil, and an oil path, separate from the oil inlet, for directing leaking oil downward into the oil passage. In this embodiment, because leaking oil is directed downward to the oil passage in the guide bridge, it is possible to supply adequate lubricant to the surfaces of the sprocket teeth without tightly attaching the projection of the guide bridge to the engine block or other oil source, and assembly and maintenance of the chain guide mechanism can be carried out more efficiently.

DETAILED DESCRIPTION OF THE PREFERRED EMBODIMENTS

Figure 1:
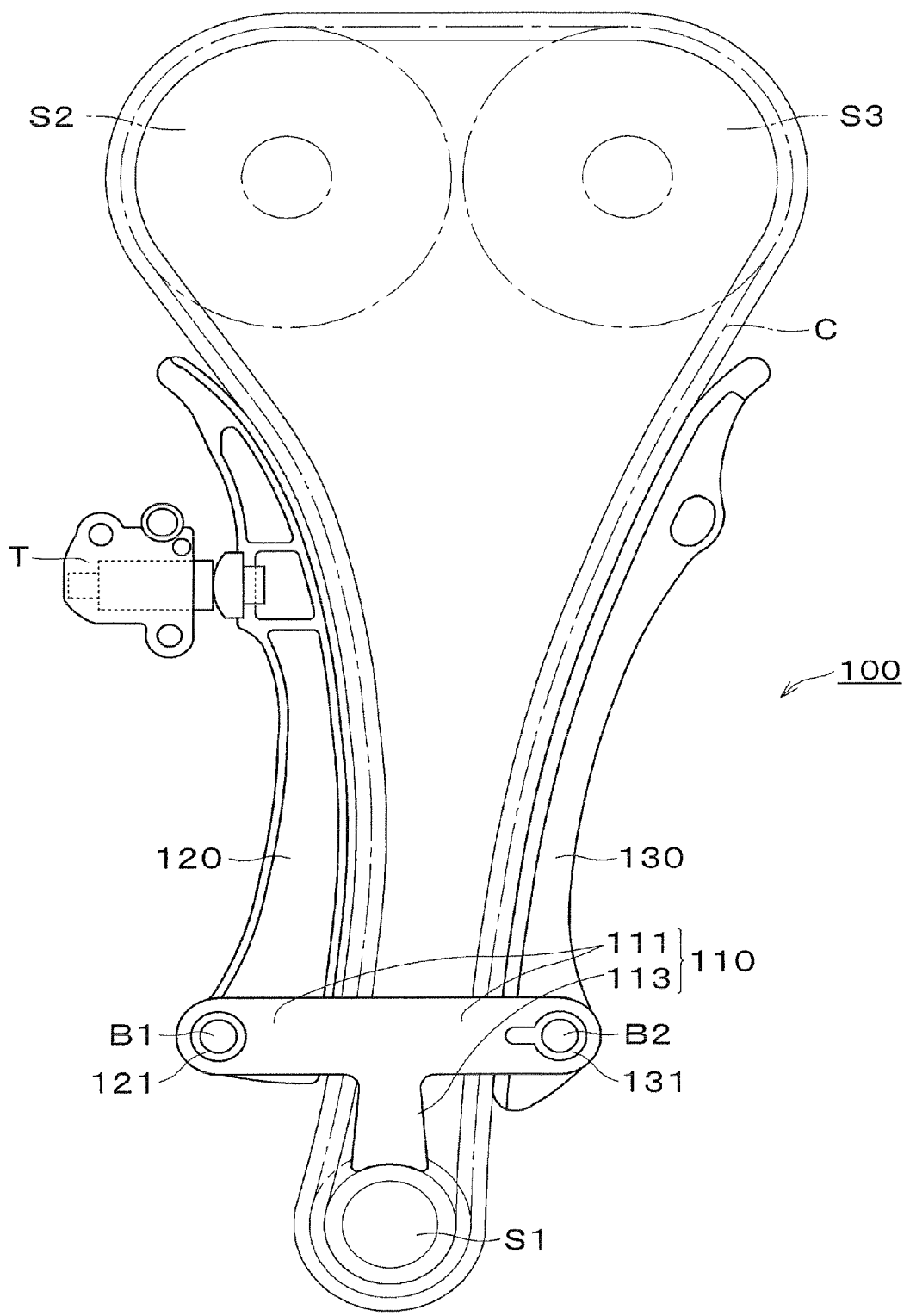
FIG. 1 is a schematic elevational view of an engine timing drive incorporating a chain guide mechanism according to the invention.

As shown in FIG. 1, the chain guide mechanism 100 of the invention is used in an engine timing drive in which an endless timing chain C is in driven relationship with an engine crankshaft sprocket S1 and in driving relationship with a pair of camshaft sprockets S2 and S3. The timing drive is typically housed within a space between the engine block and a timing chain cover.

The chain guide mechanism 100 includes a guide bridge 110 having a pair of arms 111 which extend in opposite directions from a central location, and to which are attached respectively a pivoted chain guide 120, which oscillates with changing tension in the chain C, and a fixed chain guide 130. The bridge also includes a base portion 113 which extends perpendicularly from the oppositely extending arms 111, from the central location between the arms so that the guide bridge is T-shaped. The lower part of the base portion 113 of bridge 110 is in close relationship to the driving sprocket S1.

The chain guide mechanism 100 is fixed within the space between the timing cover and the engine block by mounting shafts B1 and B2, which extend respectively into cylindrical boss 121 of the pivoted chain guide 120 and cylindrical boss 131 of the fixed chain guide 130.

Figure 2:
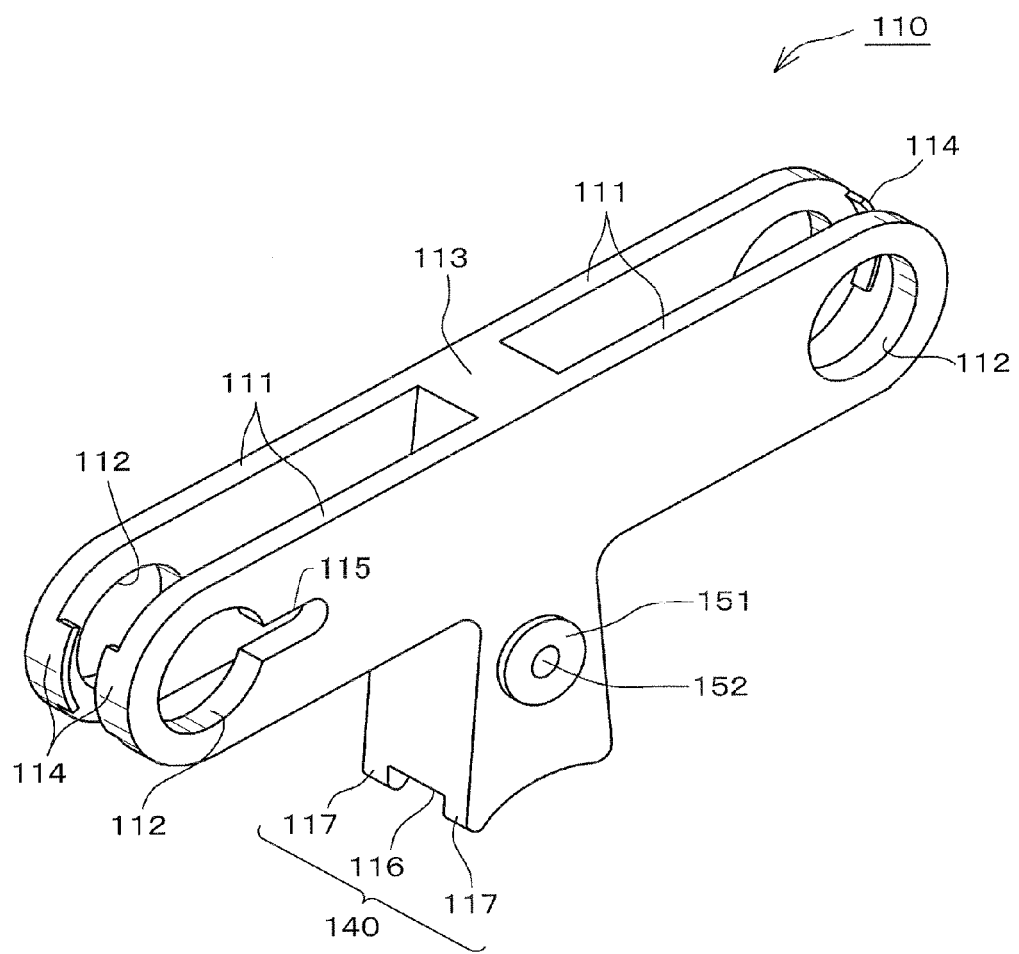
FIG. 2 is a perspective view of a guide bridge of a chain guide mechanism according to a first embodiment of the invention.
Figure 5:
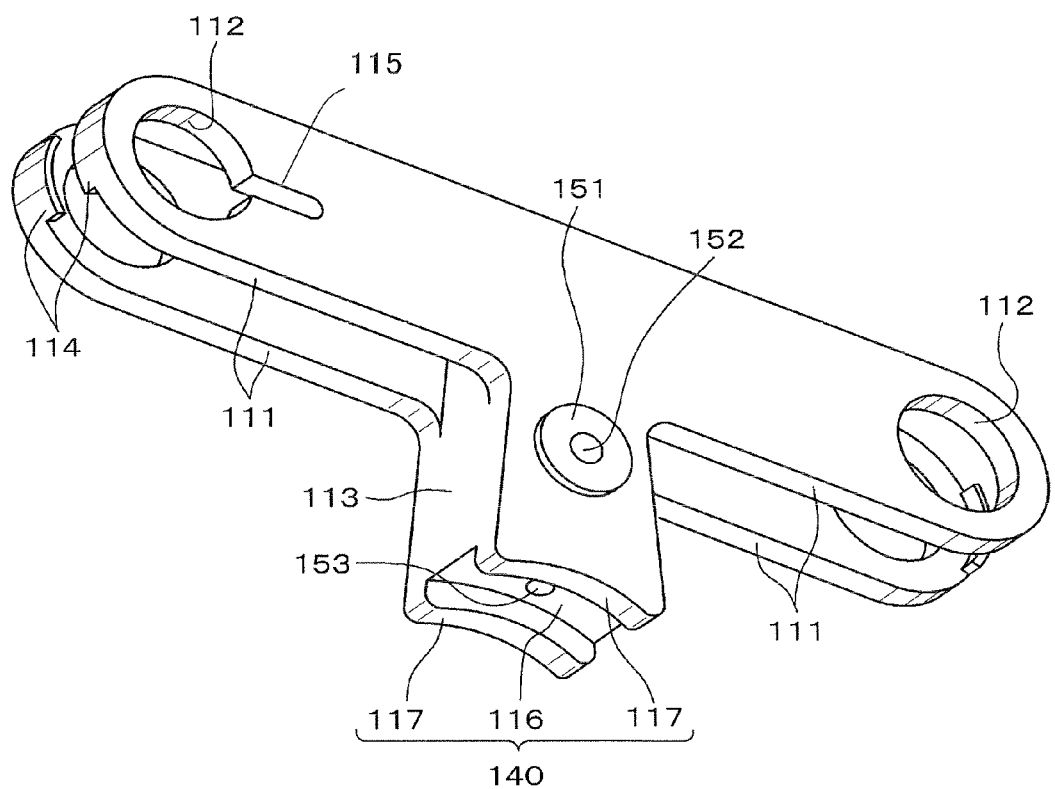
FIG. 5 is a perspective view showing the sprocket pressing part of the guide bridge in FIG. 2.

As shown in FIGS. 2 and 5, the guide bridge is formed so that each of arms 111 consists of two opposed, spaced parts, both extending in parallel relation to each other from the base portion. Guide mounting holes 112 are provided at the ends of the arms 111. The guide mounting holes 112 in both of the opposed, parallel portions of each arm are aligned with each other.

Each of the guide mounting holes 112 to which the fixed chain guide 130 is mounted is provided with a notch 115. Both parts of each arm 111 are provided with projections 114 that protrude toward each other. The purpose of these projections 114 is to prevent deviation of the guides in the direction in which arms 111 extend. The projections are provided adjacent the sides of the mounting holes 112 near the outer ends of the arms 111.

The base portion 113 of the guide bridge 110 extends from the center of the part consisting of arms 111, and is provided at its end with a sprocket pressing structure 140, composed of a groove 116 that permits sprocket teeth to pass, and sliding contact portions 117, on the both sides of the groove 116, that slidably contact boss portions of the sprocket.

The base portion 113 of the guide bridge is provided with a short cylindrical projection 151 on the surface of the side of the base portion that faces the engine block. This projection 151 has a central oil inlet opening 152.

Figure 6:
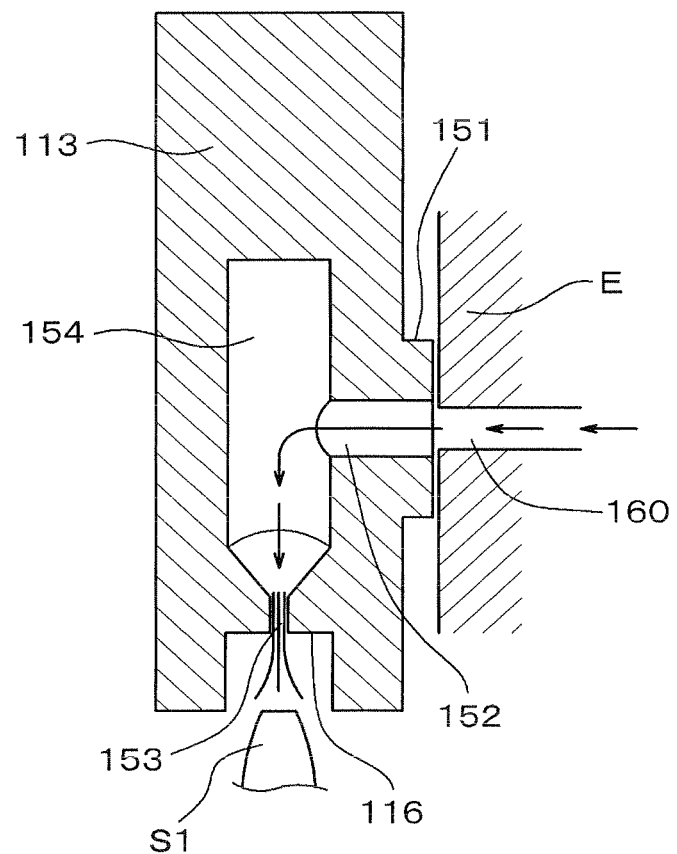
FIG. 6 is a vertical section of the guide bridge in FIG. 2.

The base portion 113 of the guide bridge is also provided with a oil discharge port 153 (FIG. 5) at the center of groove 116. As shown in FIG. 6, the oil inlet 152 communicates with the oil discharge port 153 through an internal oil passage 154 provided within the base portion 113.

Figure 3:
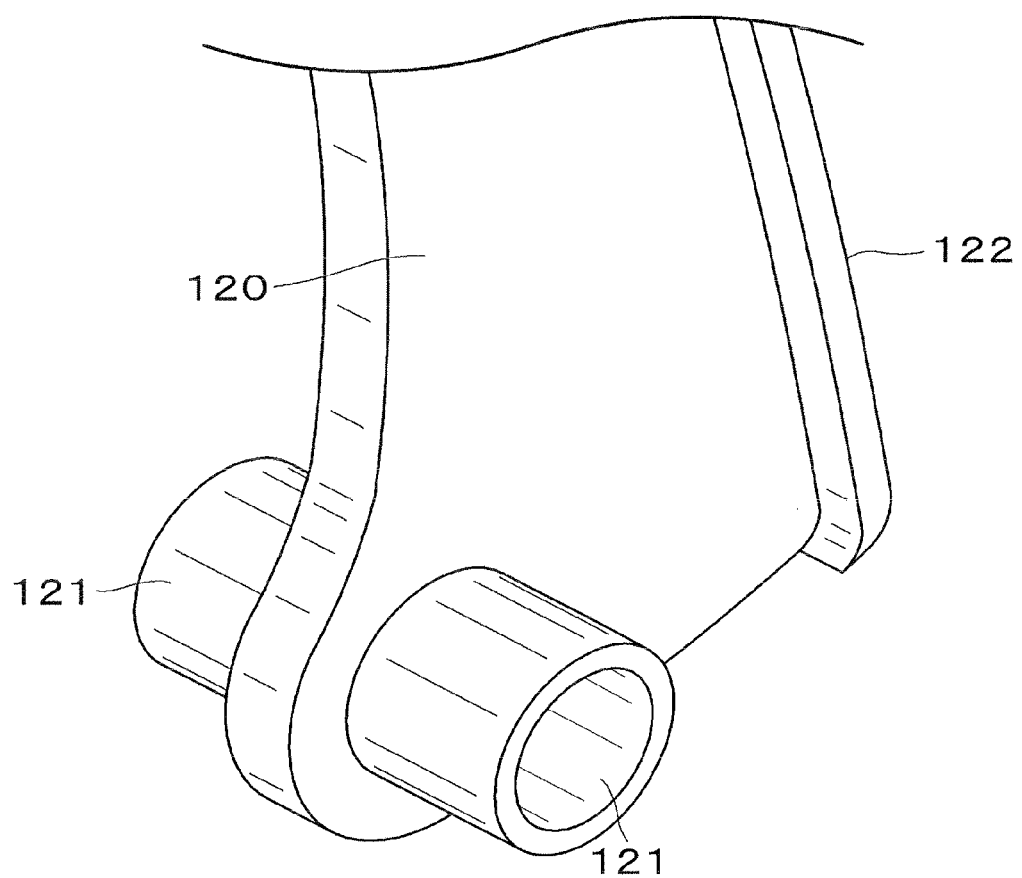
FIG. 3 is a fragmentary perspective view showing the mounting boss of a pivoting chain guide of the chain guide mechanism according to first embodiment of the invention.

As shown in FIG. 3, the movable chain guide 120 is provided with cylindrical bosses 121 that protrude in opposite directions widthwise of the guide. The movable chain guide 120 is sandwiched between the opposed parts of an arm 111 of the guide bridge 110, and is held by the guide bridge by engagement of its bosses 121 with guide mounting holes 112.

Figure 4:
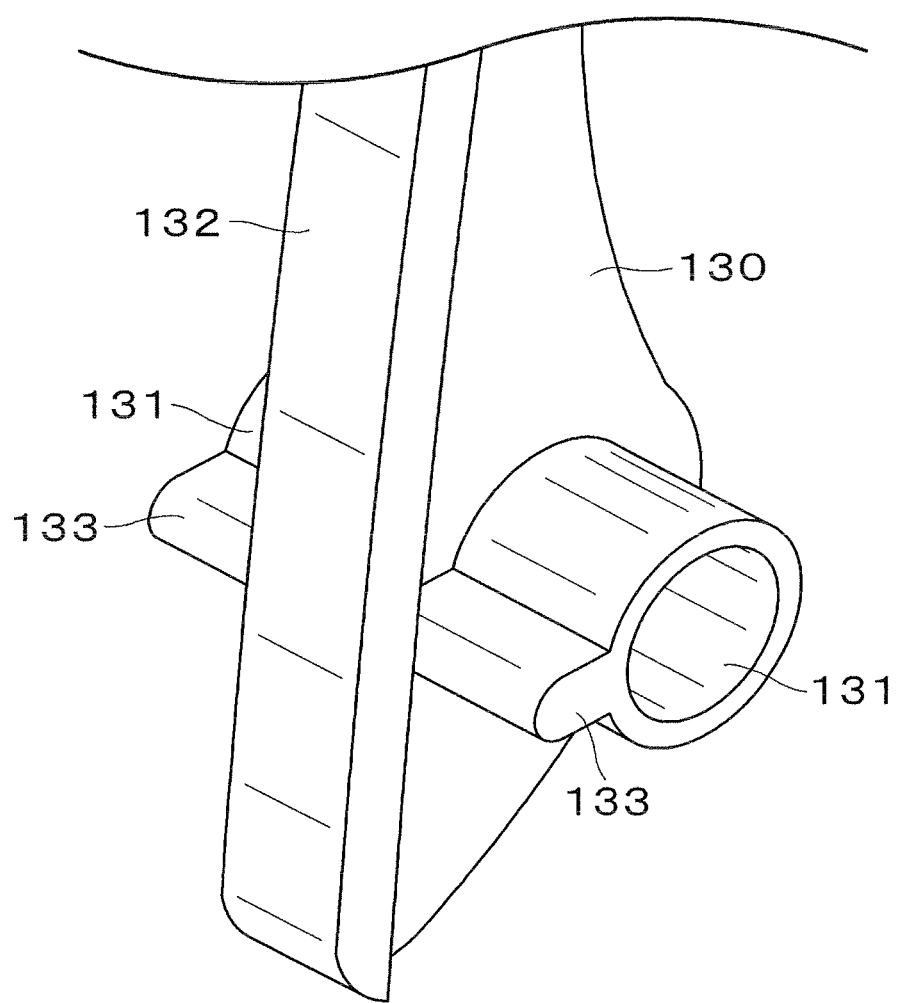
FIG. 4 is a fragmentary perspective view showing the mounting boss of a fixed chain guide.

As shown in FIG. 4, the fixed chain guide 130 is also provided with cylindrical bosses 131 that protrude in opposite directions widthwise of the guide. The outer circumferences of the bosses 131 on the fixed guide are formed with projections 133, which fit the notches 115 (FIGS. 2 and 5) to prevent pivoting motion of the fixed guide. Therefore, the fixed guide 130 is sandwiched between opposed parts of an arm 111, and is fixed against rotation relative to the guide bridge 110 by engagement of its bosses 131 with holes 112, and by engagement of its projections 133 with notches 115.

The deviation preventing projections 114 in the arms 111 of the guide bridge 110 prevent the movable chain guide 120 and the fixed chain guide 130 from deviating in the direction along which the arms 111 of the guide extend.

Figure 7:
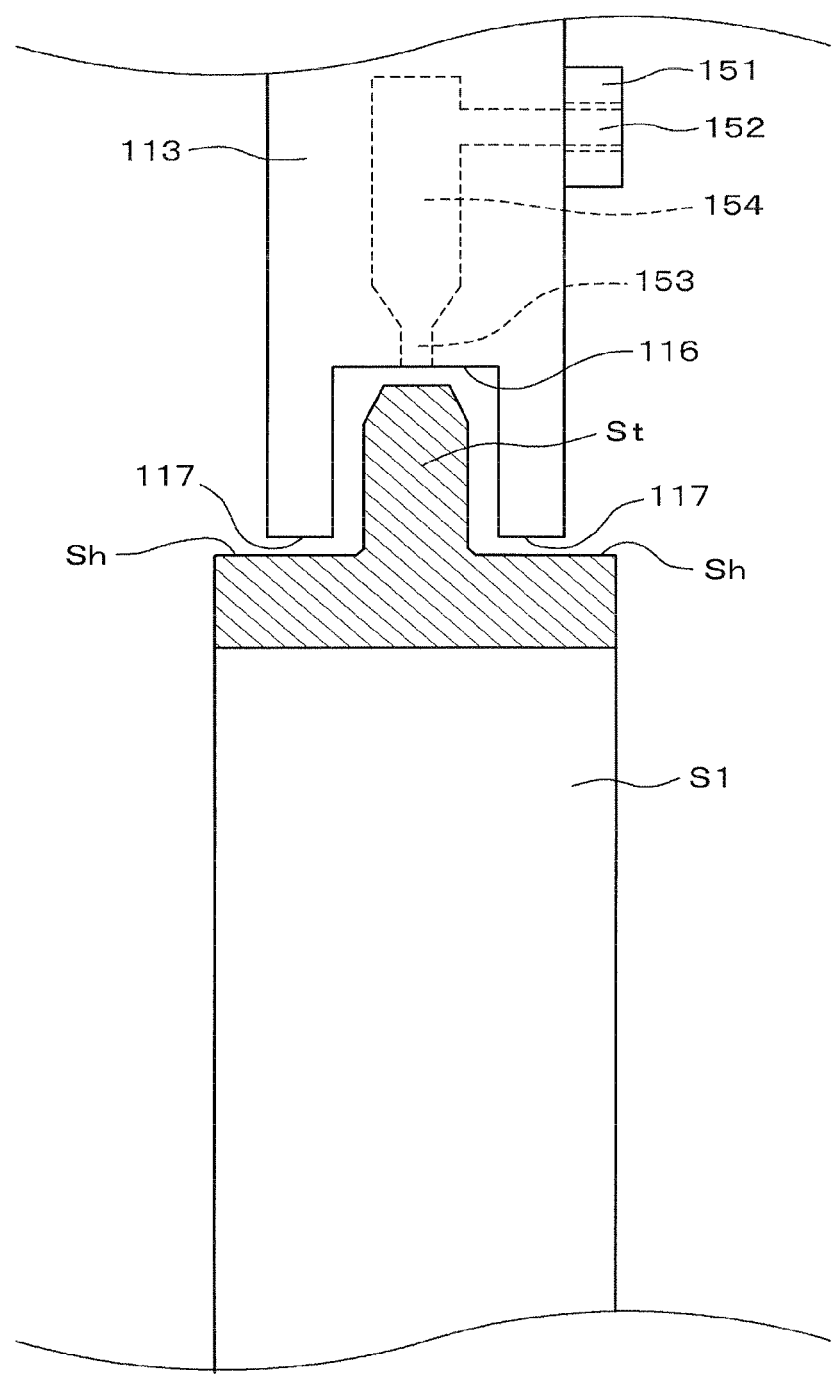
FIG. 7 is a schematic sectional view showing the relationship between a sprocket and the sprocket pressing portion of the guide bridge in FIG. 2.

As shown schematically in FIG. 7, the sprocket pressing structure at the end of the base 113 of the guide bridge is composed of a groove 116, through which the teeth St of the driving sprocket S1 pass, and sliding contact portions 117, on both sides of the groove 116, that slidably contact boss portions Sh of the driving sprocket S1. The guide bridge 110 permits chain guide mechanism 100 to be handled integrally with the driving sprocket S1 during assembly and maintenance of the timing system, by abutment of the sliding contact portions 117 with the boss portions Sh of the driving sprocket S1. Following assembly, the base portion 113 separates slightly from the bosses of the driving sprocket S1 as shown in FIG. 7, so that it does not interfere with the driving sprocket during operation of the engine.

Figure 8:
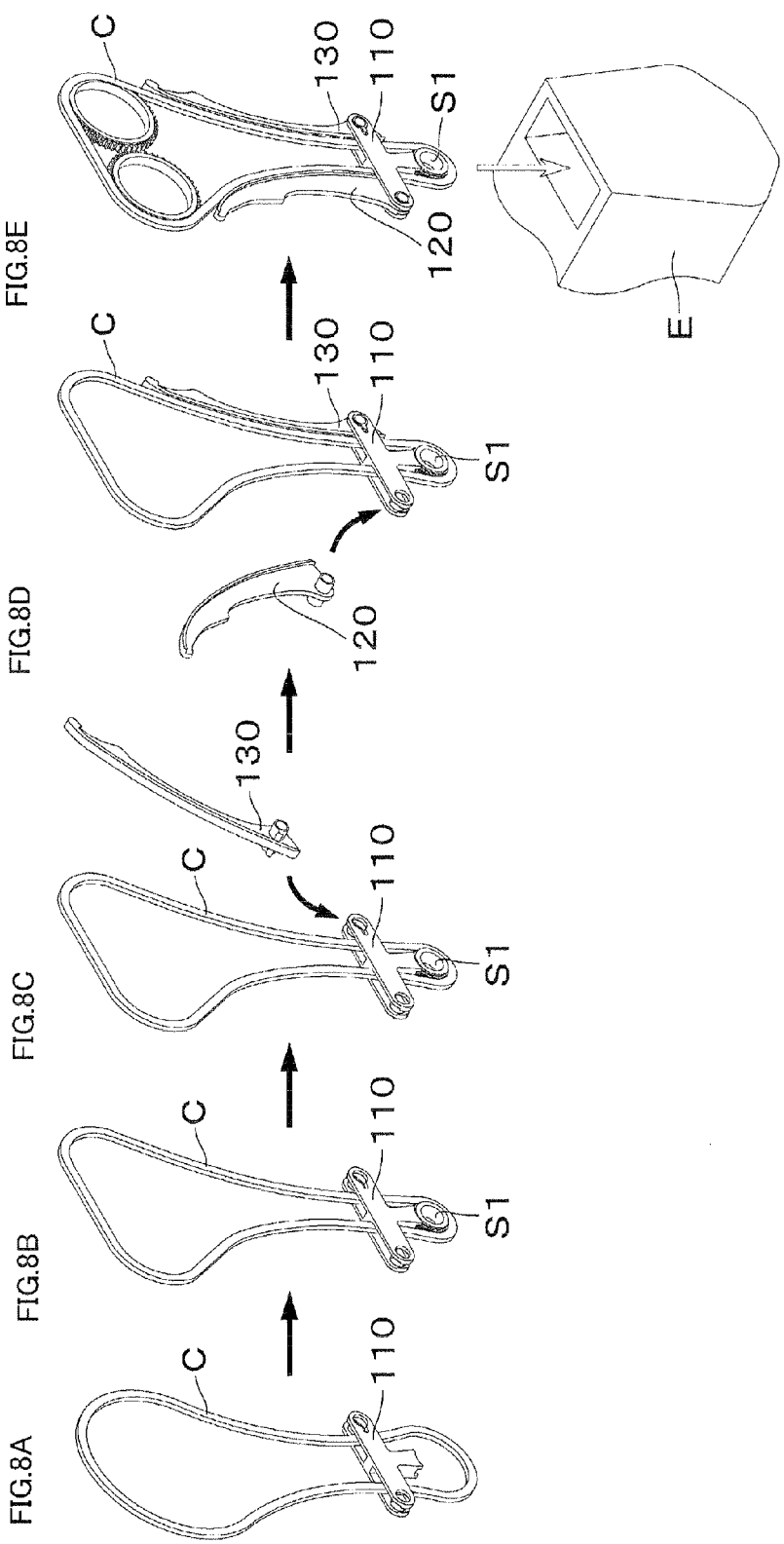
FIGS. 8A through 8E are schematic perspective views illustrating a sequential steps in the assembly of the chain guide mechanism of the first embodiment.

In the assembly of the timing system, as illustrated in FIGS. 8A-8E, the guide bridge 110 is first positioned with its base situated between the opposite sides of the chain C. These opposite sides of the chain extend respectively between opposed parts of each of the arms of the guide bridge as shown in FIG. 8a. The driving sprocket S1 is then engaged with the chain and the chain is pulled so that sprocket pressing structure 140 at the end of the base portion 113 abuts the bosses on both sides of the sprocket, as shown in FIG. 8B. The guide bridge 110 is thus secured to the driving sprocket S1 by the timing chain C.

Next, as shown in FIGS. 8C and 8D, the fixed chain guide 130 and the movable chain guide 120 are inserted into the spaces between the opposed parts of the arms 111. By a slight bending of the opposed parts of the arms, the bosses 121 and 131 (FIGS. 3 and 4) can be inserted into the guide mounting holes 112, so that the fixed and movable guides 130 and 120 are integrated with the assembly comprising the drive sprocket, the chain and the guide bridge.

At this time, the projections 133 on the outer circumference of the mounting bosses 131 of the fixed chain guide 130 are received in the notches 115 in the guide mounting holes 112, thereby to securing fixed chain guide 130 against rotation about the axis of the notched mounting holes 112.

The assembly comprising the timing chain, the driving sprocket, the guide bridge, and the fixed and movable guides can be handled as a unit during installation on, or removal from, an engine block E as shown in FIG. 8E. The integration of these components greatly facilitates assembly and maintenance of the timing drive.

Figure 9:
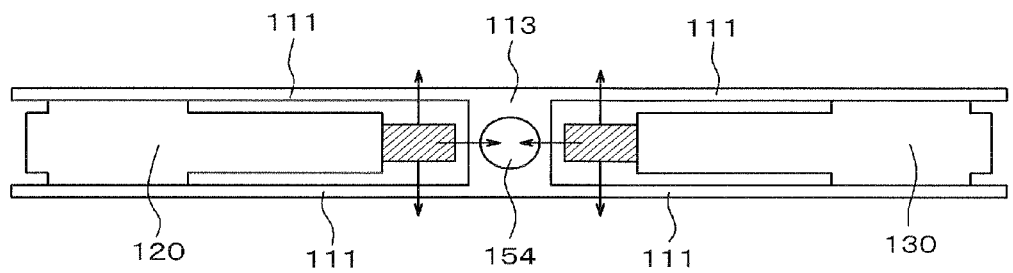
FIG. 9 is a section view through the chain guides and bridge in the first embodiment of the invention showing the relationship between the chain guide mechanism and a traveling transmission chain.

In addition, as shown in FIG. 9, because the timing chain C is disposed within spaces between opposed parts of the arms of the guide bridge, each of two parts of the chain passes through a space bounded by the base 113 of the guide bridge, the opposed parts of an arm 111 of the guide bridge, and a guide 120 or 130. The base 113 and the arms 111 of the guide bridge restrict movement of the chain in the directions of the arrows in FIG. 9 while the guides restrict outward movement of the chain. Thus, the bridge functions as a guide capable of stabilizing the travel of the timing chain C when the chain meanders or vibrates.

Figure 14:
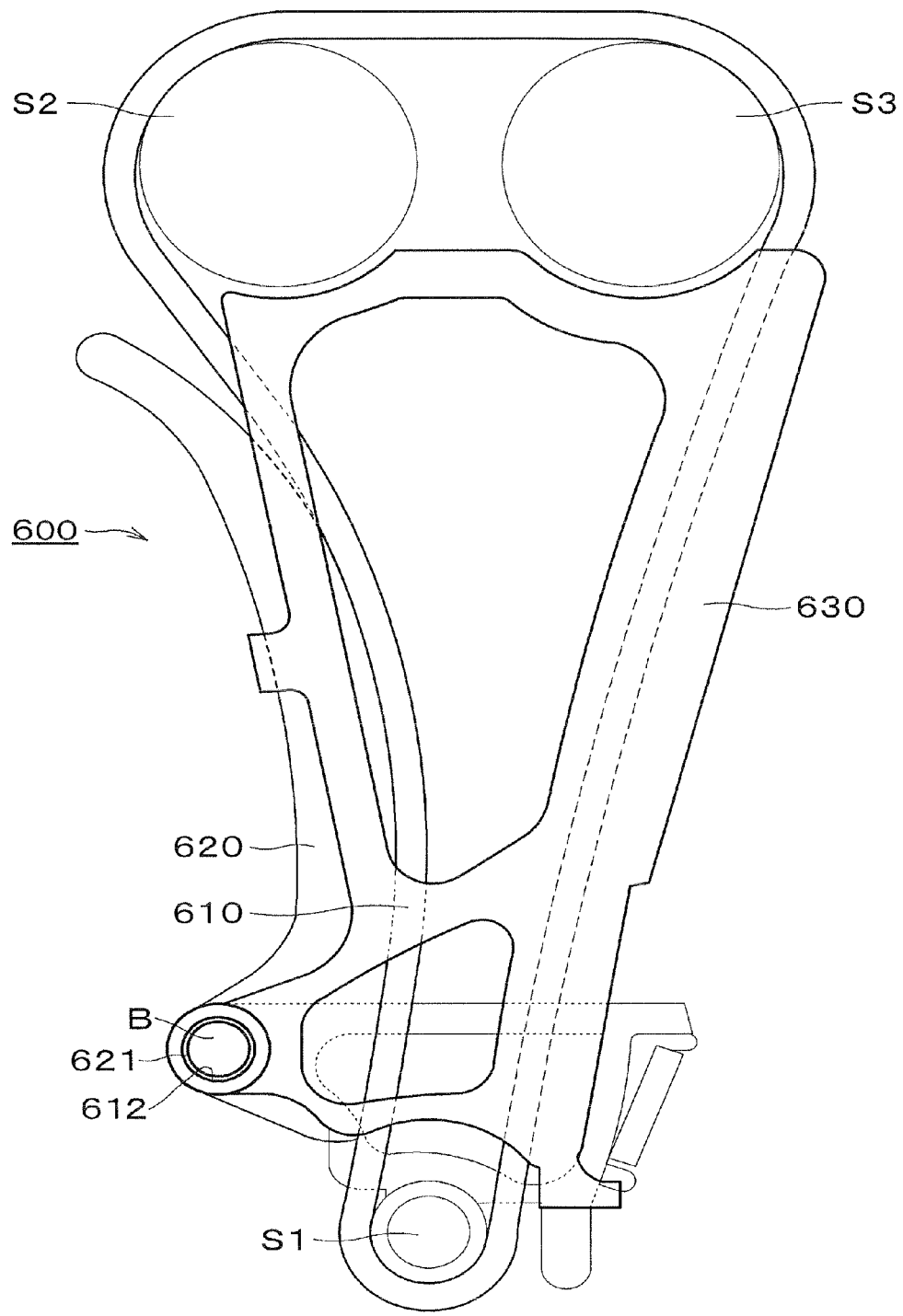
FIG. 14 is a schematic elevational view of an engine timing drive incorporating another conventional chain guide mechanism.
Figure 15:
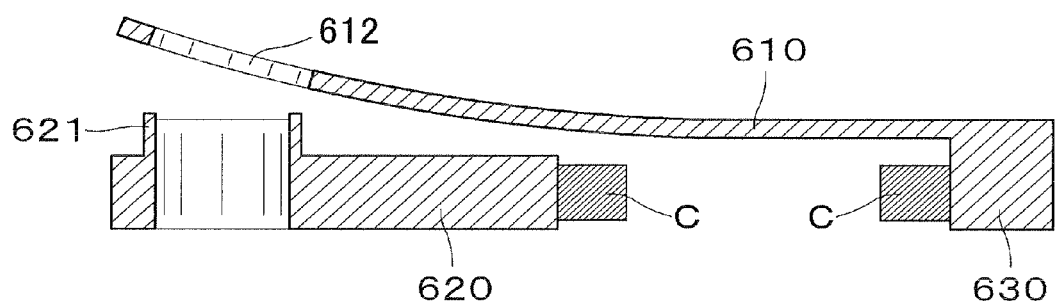
FIG. 15 is a schematic cross-section view of the chain guide mechanism of FIG. 14, showing how the mounting boss of a pivoting chain guide can separate from its mounting hole in a guide bridge.

Because the guide bridge 110 is located near the driving sprocket S1, its size can be reduced, and it can be manufactured readily and exhibit improved dimensional accuracy. The guide bridge 110 does not cover the surfaces of the guides with which the chain comes into sliding contact, and therefore does not hamper lubrication of the chain or impede dissipation of heat from the timing system. The opposed parts of arms 111 on both sides of the base 113 are short in comparison to the arms on the conventional guide bridge of FIGS. 14 and 15, and can therefore be light in weight, but at the same time sufficiently resilient to permit attachment of the fixed and movable guides to the guide bridge but nevertheless sufficiently stiff to avoid accidental disengagement of the guides from the guide bridge as a result of deformation of the arms.

An engine block on which the chain guide mechanism of the invention is incorporated has internal oil passages for supplying lubricating oil to one or more external engine components on which oil flows downward by gravity. As shown in FIG. 6, engine block E is provided with a oil supply port 160, which is opposite the oil inlet 152 of guide bridge base 113 when the chain guide mechanism is installed on the engine.

When the projection 151 on the base 113 is firmly engaged with the engine block E, oil discharged from the oil supply port 160 flows into inlet 152 and through internal passage 154 to discharge port 153 within the groove 116, from which the oil is supplied to the sprocket S1.

Figure 10:
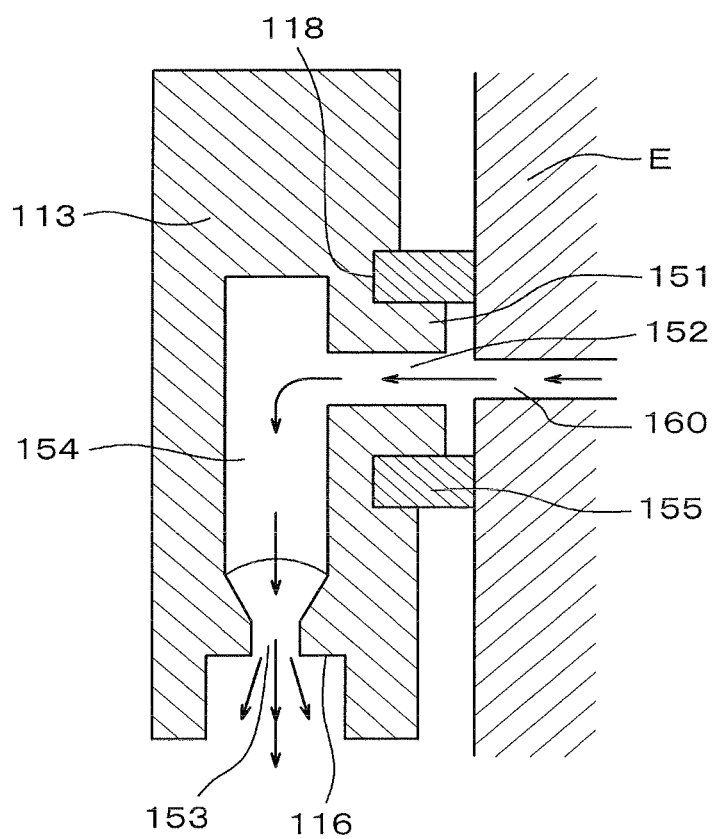
FIG. 10 is a vertical section of the guide bridge according to a second embodiment of the invention.

The second embodiment, shown in FIG. 10, differs from the first embodiment only in the configuration of the guide bridge. Other structures of the chain guide mechanism are the same as in the first embodiment.

The guide bridge 110 of the second embodiment is provided with the short cylindrical projection 151 on a surface of the base 113 facing the engine block E. Projection 151 is provided with an oil inlet 152 at its center.

The base 113 of the guide bridge 110 is also provided with an oil discharge port 153 opening at the center of the groove 116. The oil inlet 152 communicates with the oil discharge port 153 through an internal oil passage 154 provided within the base 113.

An annular groove 118 is formed in the base 113, surrounding the projection 151 and facing the engine block E. A resilient sealing member 155 formed of a resilient material such as rubber, fits over projection 151, and into the groove 118, and protrudes beyond the end of projection 151 into engagement with the wall of the engine block.

The resilient sealing member 155 becomes firmly engaged with the engine block E, and prevents leakage of oil discharged from the oil supply port 160 to the oil inlet 152.

Figure 11:
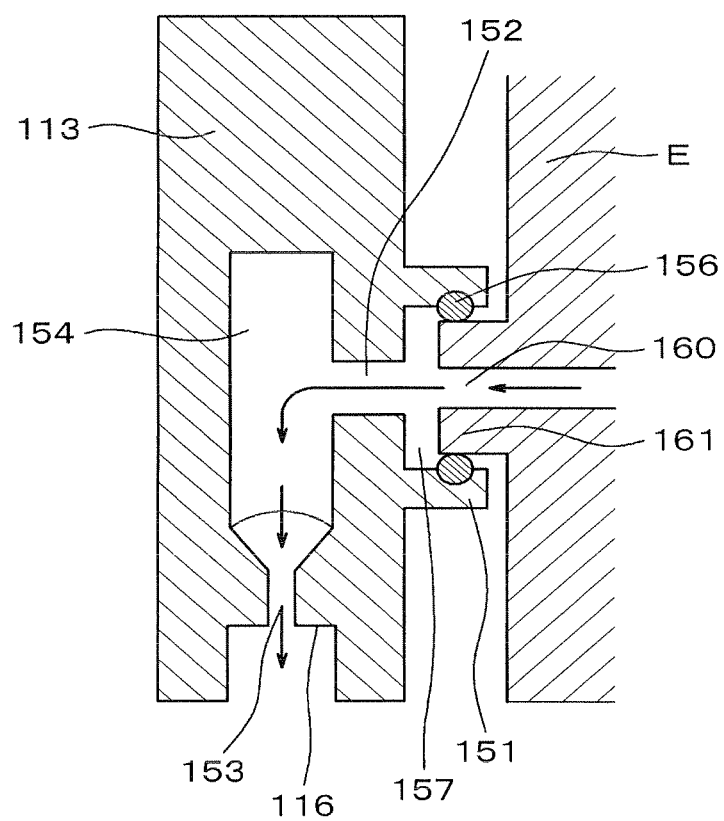
FIG. 11 is a vertical section of the guide bridge according to a third embodiment of the invention.

A third embodiment of the chain guide mechanism, shown in FIG. 11, is also different from the first embodiment only in the configuration of the guide bridge. The guide bridge of the third embodiment is provided with a short cylindrical projection 151 on the surface of the base 113 facing the engine block E. Within the center of projection 151 the base is provided with an oil inlet 152.

The base 113 is also provided with oil discharge port 153 at the center of its groove 116. The oil inlet 152 communicates with the oil discharge port 153 through an internal oil passage 154 within the base 113.

The projection 151 facing the engine block E is provided with a hole 157 having a diameter larger than that of the oil inlet 152. The engine block E is provided with a projection 161 surrounding its oil supply port 160.

A sealing member 156, formed of a resilient material such as rubber, is fixed in a groove formed on the inner circumference of hole 157 of the projection 151. The diameter of projection 161 on the engine block is slightly greater than the relaxed inner diameter of the sealing member so that, when it is inserted into the sealing member, it deforms the sealing member by compressing it outwardly. The hole 157 of the projection 151 is fitted onto, and firmly attached to, the supply projection 161 of the engine block E by the sealing member 156. Consequently, as in the second embodiment, oil discharged from oil supply port 160 is supplied from the oil inlet 152 without leakage.

The cooperation of projection 151 on the guide bridge base, with seal 156 and projection 161 of the engine block not only ensures a firm, leak-resistant, attachment of the guide bridge to the engine, but simplifies positioning of the guide bridge may be on the engine block. Accordingly, the number of other positioning devices can reduced and assembly of the chain guide mechanism can be simplified.

Figure 12:
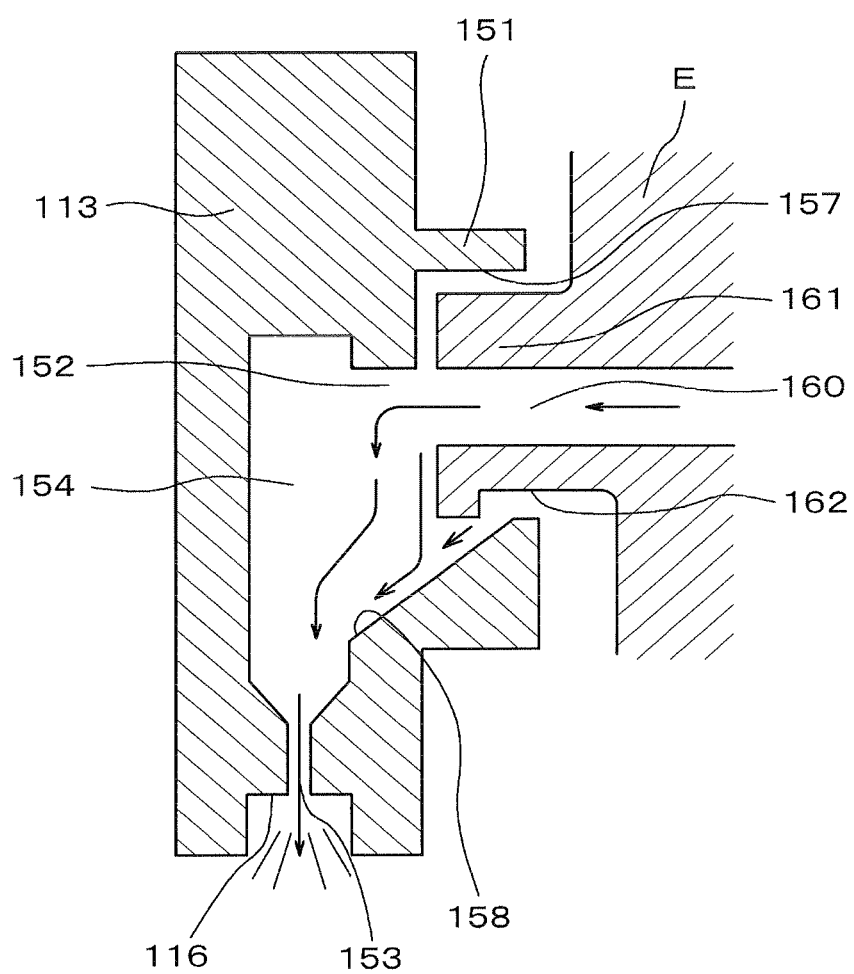
FIG. 12 is a vertical section of the guide bridge according to a fourth embodiment of the invention.
Figure 13:
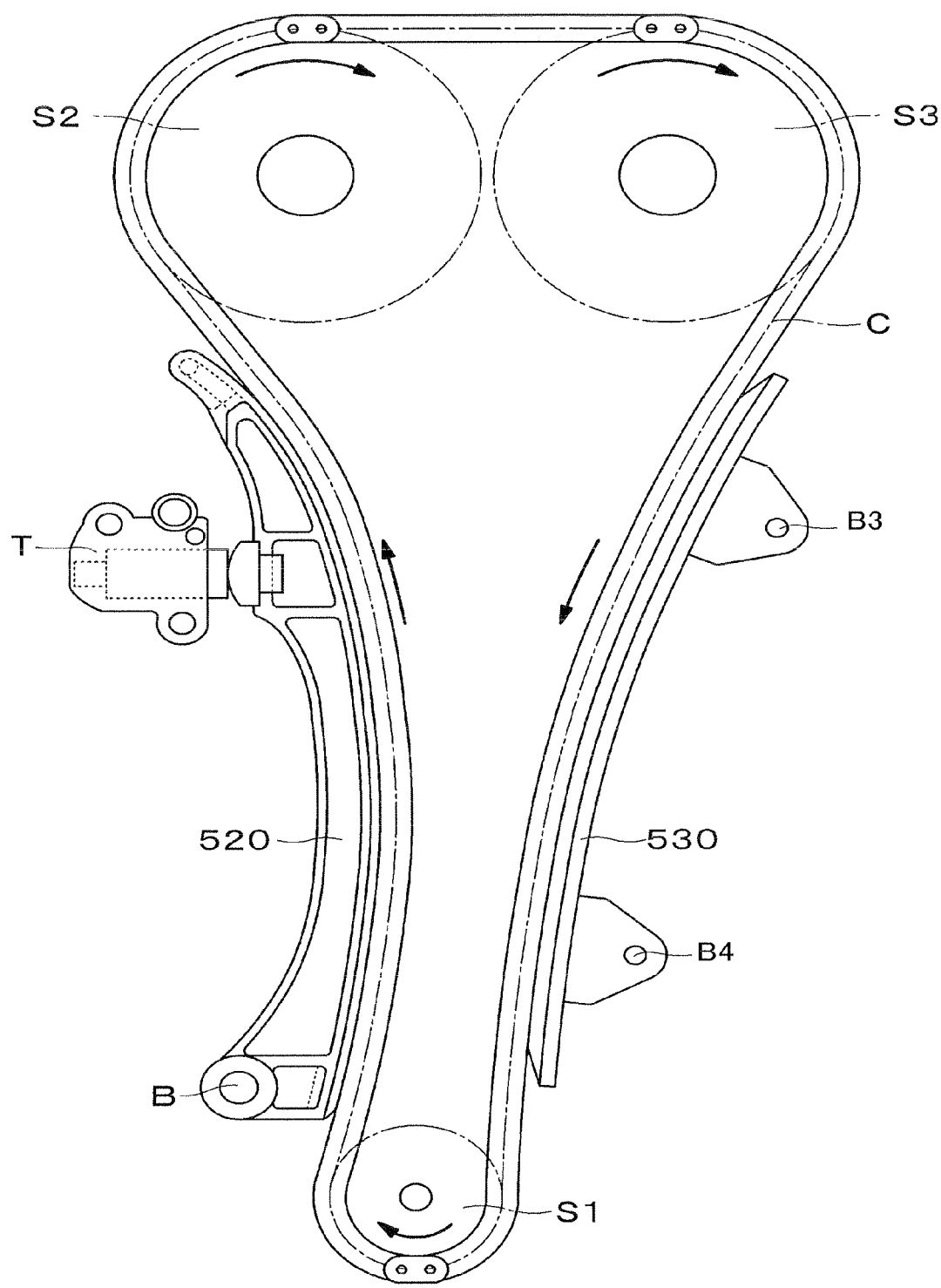
FIG. 13 is a schematic elevational view of an engine timing drive incorporating a conventional chain guide mechanism.

The fourth embodiment of the chain guide mechanism, as shown in FIG. 12, is also different from the first embodiment only in the configuration of the guide bridge. In this embodiment, the guide bridge is provided with a short cylindrical projection 151 on the surface of the base 113 of the guide bridge facing the engine block E, and an oil inlet 152 opening is provided within the projection 151.

The base 113 is also provided with an oil discharge port 153 at the center of the groove 116. The oil inlet 152 communicates with the oil discharge port 153 through internal oil passage 154 within the guide bridge base.

The interior of projection 151 is larger than the oil inlet 152. The engine block E is provided with a supply projection 161 surrounding an oil supply port 160. Projection 161 extends into the interior of projection 151 on the guide bridge base.

An oblique oil-receiving portion 158 if provided on the lower side of hole 157, i.e., the side nearest the sprocket pressing end of the guide bridge base. This oil receiving portion 158 receives oil discharged from the supply projection 161, guiding the oil downward to the oil passage 154. The lower side of the projection 161 on the engine block E, i.e., the side nearest the sprocket pressing part of the guide bridge base, is also provided with a recess 162 which overlies the upper end of the oblique oil-receiving portion 158. Oil that flows from the opening of oil supply port along the projection 161 toward the engine block drips onto oil receiving portion 158, and also flows toward the internal oil passage 154. Consequently, the configuration of the guide bridge base in FIG. 12 can also prevent leakage of oil, and ensure a full supply of oil to the driving sprocket even without seals as in the second and third embodiments. Even if the hole 157 in projection 151 does not closely fit projection 161 on the engine block, and oil leaks as a result, the leaking oil drips onto the oil-receiving portion 158 and is discharged through the oil discharge port 153 via the oil passage 154 as shown by arrows in FIG. 12. In the embodiment of FIG. 12, it is also easy to fit the projection of the guide bridge base 113 onto the projection 161 on the engine block during assembly and maintenance.

Various modifications can be made to several embodiments of the chain guide assembly described above. For example, in each of the embodiments, it is possible to prevent the chain guides from being assembled erroneously by positioning the guide deviation preventing projections 114 on the respective arms at different distances from the centers of the guide mounting holes 112. If the distance from the center of a guide mounting hole 112 to an adjacent pair of projections 114 is less than the distance from the center of the guide bosses to the edge of the guide base adjacent the bosses, the bosses cannot fit the mounting holes without having the projections 114 interfere with the guide base. The same objective can be achieved by making the peripheral shape of the mounting boss portions 131 of the stationary chain guide 130 different from the peripheral shape of the mounting boss portions 121 of the pivoting chain guide 120.

Although in the embodiments described, the arms 111 on both sides of the base 113 extend orthogonally to the direction in which the base 113 extends toward the driving sprocket S1, the arms may extend at angles other than the right angle. Furthermore, shapes of the arms can be modified. For example the widths of the arms in the direction of travel of the timing chain can be increased so that the arms can serve as guides limiting lateral movement of the timing chain.

The material of the surfaces of the chain guides on which the chain slides should exhibit a low frictional resistance with the chain. The surfaces of the chain guides on which the chain slides, can be unitary parts of the chain guides if the guides are molded from a material having favorable sliding characteristics. Alternatively, the surfaces on which the chain slides can be surfaces of shoes that are attached to supporting members of the chain guides. The material should exhibit durability in a high temperature environment and at the same time exhibit smooth sliding contact with a traveling transmission chain. Suitable materials include synthetic resins such as polyamide 6, polyamide 46, polyamide 66, polyacetal resin, and the like.

Because it is possible that the guide bridge will contact the chain when the chain transmission is in operation, it is also desirable to form the guide bridge from a material having a low frictional resistance with the chain, and which is durable in a high temperature environment. Thus, it is preferable to form the guide bridge from same material used to form the chain-engaging surfaces of the chain guides.

The chain guide assembly not only allows the chain guides, the chain, and the driving sprocket to be held together for more efficient assembly and maintenance, but also ensures adequate lubrication of the driving sprocket by providing for flow of oil to the groove in the sprocket-pressing part of the guide bridge.

The invention also allows conventional stationary and pivoting chain guides to be used with a minimum of modification, i.e., by modifying only their mounting bosses. Accordingly, the invention allows for control of manufacturing costs.

What is claimed is:

1. A chain guide mechanism, comprising:
   a plurality of chain guides for sliding relationship with a traveling chain; and
   a guide bridge for integrally holding the plurality of chain guides;
   wherein:
   said guide bridge has a base, and a pair of arms extending in opposite directions from the base;
   each of said arms comprises two opposed, spaced parts extending on opposite sides of one of the chain guides whereby a portion of one of said chain guides is disposed between the opposed parts of each of said arms;
   a pair of cylindrical mounting bosses extends in opposite directions from each said portion of each chain guide;
   each of said opposed, spaced parts is formed with a guide mounting hole for receiving each mounting boss on the chain guide portion therebetween;
   said base of the guide bridge extends from an intermediate portion between the arms in a direction substantially perpendicular to the directions in which said arms extend, whereby the guide bridge is substantially T-shaped;
   said base has a sprocket-pressing end portion for sliding contact with a sprocket;
   said base has a surface facing in a direction perpendicular to the directions in which said arms extend and also perpendicular to the direction in which said base extends from said intermediate portion;
   said sprocket-pressing portion has a central groove that permits the teeth of said sprocket to pass, and sliding contact portions on both sides of the central groove for sliding engagement with boss portions of said sprocket on both sides of the teeth of said sprocket; and
   said guide bridge has an oil inlet on said surface of the base, an oil discharge port opening to the groove of the sprocket pressing portion, and an oil passage provided within the base connecting the oil inlet to the oil discharge port.

2. The chain guide mechanism according to claim 1, in which said base has an oil-receiving portion for receiving leaking oil, and an oil path, separate from said inlet, for directing leaking oil downward into said oil passage.

3. The chain guide mechanism according to claim 1, wherein said surface of the base is provided with a projection, said oil inlet is formed in said projection, and the projection is provided with a seal for engaging an oil supply port and for preventing leakage of the oil supplied by said oil supply port to the oil inlet.

4. The chain guide mechanism according to claims 3, wherein said seal is a rubber ring.

5. The chain guide mechanism according to claim 3, wherein said seal is a resilient member that protrudes farther than said projection.

6. The chain guide mechanism according to claims 5, wherein said seal is a rubber ring.

7. The chain guide mechanism according to claim 3, wherein said projection has an inner circumferential surface, and wherein the seal is an annular sealing member fitted to said inner circumferential surface.

8. The chain guide mechanism according to claims 7, wherein said seal is a rubber ring.

* * * * *